No. 607,444.

Patented July 19, 1898.

J. H. LEWIS & J. M. COURTNEY.
CAR FENDER.
(Application filed July 19, 1897.)

(No Model.)

Witnesses:
E. B. Tinker

Inventors
J. M. Courtney and J. H. Lewis,
By Higdon & Higdon,
Attys.

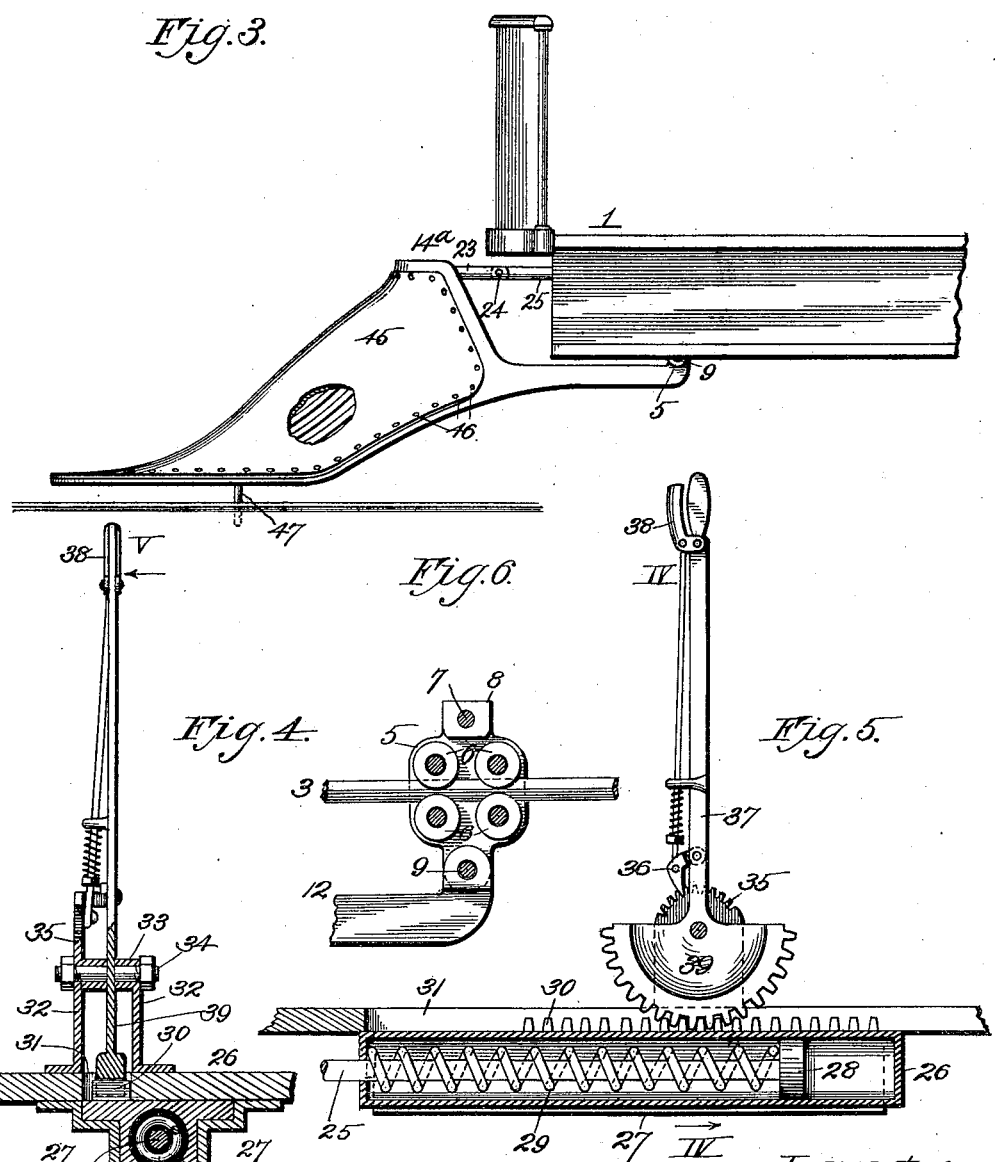

UNITED STATES PATENT OFFICE.

JAMES H. LEWIS AND JOSEPH M. COURTNEY, OF KANSAS CITY, MISSOURI.

CAR-FENDER.

SPECIFICATION forming part of Letters Patent No. 607,444, dated July 19, 1898.

Application filed July 19, 1897. Serial No. 645,151. (No model.)

*To all whom it may concern:*

Be it known that we, JAMES H. LEWIS and JOSEPH M. COURTNEY, of Kansas City, Jackson county, Missouri, have invented certain new and useful Improvements in Car-Fenders, of which the following is a full, clear, and exact description, reference being had to the accompanying drawings, forming a part thereof.

Our invention relates to car-fenders; and it consists in certain novel and peculiar features of construction and combinations of parts, as will be hereinafter described and claimed.

The object of the invention is to produce a fender whereby an object, either animate or inanimate, will be forced off the track to one side or the other and which will yield either longitudinally, laterally, or vertically to such impact, so as to lessen the chances of injury either to the object or to the fender.

A further object of the invention is to produce a fender which may be adjusted longitudinally, so as to elevate or depress its front or pointed end to accommodate ascending or descending grades.

Other objects of the invention will hereinafter appear.

In order that the invention may be fully understood, we will proceed to describe it with reference to the accompanying drawings, in which—

Figure 1 represents, partly broken away, a grip-car provided with a fender in vertical longitudinal section embodying our invention. Fig. 2 represents a plan view of the same with the car partly broken away. Fig. 3 represents upon a car our improved fender provided with an imperforate cover in order that it may be used, if desired, as a snowplow. Fig. 4 represents a vertical section taken on the line IV IV of Fig. 5. Fig. 5 represents a section taken on the line V V of Fig. 4. Fig. 6 represents a sectional view of one of the sliding clips connected pivotally to the fender.

In said drawings, 1 designates a car, which may be a grip, electric, or any other kind of car.

2 designates brackets of the type shown or of any other preferred type, said brackets being secured rigidly to the under side of the car near its front end.

3 designates a pair of rods which are struck from the same center and are oppositely located, said rods at their ends bending upwardly and terminating in plates 4, secured rigidly to the brackets 2, or said rods 3 may be otherwise supported. A pair of clips are mounted upon the rods 3 and consist each of a pair of plates 5, between which are journaled the grooved rollers 6, which embrace the upper and lower sides of the rod 3 snugly, the bolt 7 connecting the upper ends of said plates and clamping them firmly to the interposed block 8, through which said bolt extends, and a bolt 9 connecting the lower ends of said plates.

10 designates strong spiral springs, which are mounted upon the rods 3 in advance of the clips and tend to force the same rearwardly at all times. 11 designates counteracting springs, which are also mounted upon the rods 3 and are arranged so as to exert continuously a forward pressure upon the clips. The said springs 10 and 11, therefore, obviously counteract the influence of each other and normally maintain said clips at about the middle of said bar.

12 designates the rearwardly-projecting arms of the fender 13, said arms being mounted pivotally upon the bolts 9 of said clips.

The fender embodies a skeleton frame 14 of the contour illustrated and is bent out at its middle and upper portion, as shown at 14ª, to accommodate the car-coupler, (not shown,) projecting forwardly from the car, in case it occupies a position just below the floor of the car. With most grip-cars, however, the draw-head is located at a point about half-way between the floor and the ground, and with these the jag or bend is not needed.

The body of the fender by preference consists of a series of longitudinally-extending and downwardly-sloping curved rods 15, which are riveted or bolted at their upper ends, as at 16, to the framework, and at their lower ends are secured in the heads or nuts 17, formed at the upper ends of the bolts 18, which bolts extend downward through the horizontal V-shaped front portion of the framework and the similar V-shaped portion 20, which parallels the same below, and journaled upon said bolts between the portion 19 of the fender and the mating portion 20 are the rollers 21, tired with rubber or equivalent material, which are adapted to diminish the chances of injury to the object struck by the fender, and by their antifriction action insure that the object is pushed to one side. As an illustration of this function suppose a person be knocked down or fall down in advance of a car provided with this fender and the latter strike him. It will be natural for him under the circumstances to grasp the fender, and thereby be more apt to be injured. With this fender, however, the chances are in favor of his grasping it adjacent to or by one of said rollers, as they project beyond its front end, and it is obvious that if he should it would turn, his grasp be broken, and the fender more reliably push him to one side and out of danger.

In order to strengthen the fender as much as possible, at its center or apex it is provided with a longitudinally-arranged angle-plate 15$^a$, and secured to the under side of the same at its apex is a V-shaped cross-bar 15$^b$, which is also riveted or bolted to each of the rods 15, so as to render them less susceptible to bending if struck by or in striking a heavy object.

To sustain the fender with its protecting-armor of rollers in about a horizontal position and four or five inches from the ground, it is provided at its upper end and middle with an eye 22, to which is pivotally connected the front end of a link 23, pivoted in turn, as at 24, to the front end of a rod 25. This rod projects into a longitudinally-arranged frame 26, mounted to slide in the ways 27, secured to the under side of the car. The rear end of the rod is provided with a rigid head or collar 28, and spirally encircling said rod and bearing at its opposite ends against the front end of the frame 26 and the opposing or front side of the head or collar 28 is a spiral expansion-spring 29, the function of the same, as hereinbefore indicated, being to sustain the fender in proper position. Said sliding frame is provided with a longitudinal series of rack-teeth 30, projecting upwardly into a slot 31 in the floor of the car at a point convenient to the grip or motor man. About the middle and at opposite sides of said slot a pair of standards 32 are erected vertically upon the floor of the car, provided with sleeve-bearings 33 at their upper ends, in which is journaled the shaft 34, secured reliably in position by nuts in the customary manner. One of said standards is formed with or carries the notched sector 35, and engaging the same is a spring-actuated pawl 36, mounted pivotally on the lever 37, and connected to the same, that it may be withdrawn from engagement with the sector when desired, is a grip-lever 38, the connection being made in the customary manner. The lever 37 at its lower end carries or is formed with a mutilated gear or cog wheel segment 39, which meshes at all times with the rack-teeth 30 in order that by grasping and manipulating the lever 37 in the customary manner the frame 26 may be moved forward or rearward. If moved forward, owing to the fact that the clips hereinbefore described remain stationary, it is obvious that the jointed rod, consisting of rods 23 and 25, will bend at the point 24 and the front end of the fender as a result be depressed, its gravitative tendency alone being sufficient to depress it as soon as the rearward pressure of the spring 29 is overcome by sliding the frame 26 bodily forward. It is clear, therefore, that the fender may be depressed by the person in control, so as to maintain its proper distance from the ground even at the crest of a hill, when about to descend, or as the top of the hill is reached, that it may always be in position to prevent an object upon the track from passing below it and being crushed or mangled by the wheels of the car.

By moving the frame rearward it is obvious that the spring 29 yields until its power of resistance, due to compression, exceeds the weight of the fender, whose point is then elevated, the jointed bar, hereinbefore referred to, in this case bending upwardly at the point 24 to accommodate this movement. The fender swings upwardly of course upon the pivotal points 9.

In case a heavy object is struck by the point or middle of the fender the springs 11 will yield somewhat, and by thus cushioning the blow the fender and also the object are less liable to be injured. In case the object is struck at one side or the other of the fender it will yield laterally, owing to the fact that one of the clips will slide forward slightly upon its rod 3, while the diametrically opposite clip will move a corresponding distance rearwardly upon its respective rod 3, the spring 10 of the first rod resisting but yielding to such action as a cushion, while the spring 11 of the other rod yields to but resists the rearward movement of its corresponding clip, as will be readily understood. In both cases—that is, whether the object is struck about the middle of the fender or to one side or the other—the fender will spring downward slightly, the spring 29 yielding to permit this movement, and thereby, like all of the springs described, rendering the fender less susceptible of breakage.

While we do not believe it is absolutely necessary to provide a support for the fender other than the spring 29, yet we deem it desirable to employ a medium which will, like said spring, cushion the vertical movement of the fender and at the same time by contact with the higher surfaces or tops of the grip-rails, if used in connection with a grip-car, prevent any possibility of the front end of the fender striking the roadway. The use of such devices will also render the elevation of the front end of the fender by the car-controller unnecessary, except possibly in the case of very steep grades, as by contact with the grip-slot rails it will hold the point of the fender sufficiently high to clear them. In case the fender is used upon electric cars having no extra rails two of these mediums may be employed, one to operate in connection with each track-rail.

As the drawings illustrate a grip-car, a single support for the front end of the fender is shown, and it is constructed as follows:

40 designates a rectangular casting which is bolted, as shown, or otherwise secured to the under side and middle of the fender near its front end, nearer in practice than is here shown. A rod 41, extending vertically through said frame is provided with a collar 42 within the same and is pressed downwardly by means of a spring 43, which encircles it and bears against the frame and the upper side of the collar.

Journaled in the lower end of the rod, preferably upon ball-bearings, (not shown,) is a roller 44, which in the progress of the car is normally out of contact with the grip-slot rails, but which at intervals—i. e., at the high places in the rails—is adapted to strike the same, and thereby keep the front end of the fender always out of danger, as hereinbefore explained. When the fender cleared such elevated point in the track, it would naturally swing downward, due to its gravitative tendency and acquired momentum from the movement of the car. This roller permits of a slight depression of the fender, but shortens such movement and at the same time cushions it, so as to obviate any chance of breakage or injury.

By reference to Fig. 3 it will be noticed that we have provided a sheet-metal cover 45 for the skeleton portion of the fender and bolt or rivet said cover, as shown at 46, to the framework of the fender in order that the latter may be utilized as a snow-plow. In this case, however, as it would be subjected to a continuous and heavy pressure of snow from the time the car left the barn until it returned it is desirable that a guide be employed which will be prevent the fender from swinging to the right or to the left, which it would otherwise do, as the resistance became greater upon the left or right hand side of the same. To accomplish this, we employ a rotatable pin 47, mounted, preferably, upon ball-bearings in the customary manner at its upper end (not shown) and depending through the grip-slot. This pin of course, as shown, can only be used in connection with a grip-car, but properly modified may also be employed in connection with electric or other cars.

From the above description it will be apparent that we have produced a car-fender which will positively and reliably perform its various functions as pointed out and which by being cushioned in its every movement is susceptible of long service. It is obvious also that it is simple, strong, durable, compact and comparatively inexpensive of construction and may be used in connection with almost any style of car and be under perfect control of the person in charge of the same.

It is apparent, of course, that various changes may be made in the form, proportion, detail construction, and arrangement of the parts without departing from the spirit and scope or sacrificing any of the advantages of the invention.

Having thus described the invention, what we claim as new, and desire to secure by Letters Patent, is—

1. The combination with a car, of a fender pivotally supported, a frame suitably supported, a rod extending rearwardly into said frame and provided with a head or collar, a link pivotally connecting the front end of said rod with the fender in a plane above the pivot thereof, and a spring within said frame and pressing rearwardly against said head or collar, for the purpose set forth.

2. The combination with a car, of a pivoted fender a sliding frame, a rod projecting rearwardly into said frame and linked at its front end to the fender above the pivot thereof, a head upon its rear end, a spring within the frame and pressing rearwardly against said head, and means to slide said frame forwardly to permit the fender to spring downwardly, substantially as described.

3. The combination with a car, of a pivoted fender, a sliding frame, a rod projecting rearwardly into said frame and linked at its front end to the fender above the pivot thereof, a head upon its rear end, a spring within the frame and pressing rearwardly against said head, and means to slide the frame rearwardly to elevate the front end of the fender, substantially as described.

4. The combination with a car, of a pivoted fender, a sliding frame mounted upon the car, a rod projecting rearwardly into said frame and provided with a head at its rear end, a spring pressing against the head of said rod so as to force it rearwardly, a link pivotally connecting the front end of the rod with the fender above the pivot thereof, a lever geared to the sliding frame, and means to lock it at the required point of adjustment, substantially as described.

5. The combination with a car, of a pivoted fender, a sliding frame mounted upon the car, and provided with rack-teeth, a rod projecting rearwardly into said frame and provided with a head at its rear end, a spring pressing against the head of the said rod so as to force it rearwardly, a link pivotally connecting the front end of the rod with the fender above the pivot thereof, a toothed sector secured within the car, a lever pivoted within the car and provided with a cog-segment engaging said rack-teeth, and a spring-actuated dog mechanism carried by said lever and engaging said sector, substantially as and for the purpose described.

6. The combination with a car, of rods supported below the same and extending in substantially longitudinal lines, sliding clips mounted upon said rods, springs bearing against the front and rear edges of said clips, a car-fender pivoted to said clips, a sliding rod supported in a plane above the pivot of the fender, a link connecting the same with the fender above its pivot, and a spring holding said rod normally retracted, substantially as described.

7. The combination with a car, of a fender suitably supported, rods arranged below the floor of the car near its front end and forming opposite portions of the same circle, clips mounted slidingly upon said rods and pivoted to the fender, and springs bearing against the front and rear edges of said clips, substantially as and for the purpose described.

8. The combination with a car, of a fender suitably supported, brackets secured to the under side of the car, segmental oppositely-located rods carried by said brackets, clips provided with rollers which embrace the upper and lower sides of said rods and pivoted to said fender, and springs pressing against the front and rear edges of said clips, substantially as described.

9. The combination with a car, of a pivoted fender, a yielding support for the fender above its pivot, and a spring-depressed roller secured to the fender near its front end and adapted to contact with the high surfaces of the grip or track rails, according to the style of car structure, substantially as described.

10. The combination with a car, of a pivoted fender, a yielding support for the fender above its pivot, and a spring-depressed roller or caster carried by the fender and adapted for contact with the high surfaces of the grip or track rails, substantially as and for the purpose described.

11. The combination with a car of curved rods supported below the same and extending concentrically of a common point or center, sliding clips mounted upon said rods and held with a yielding pressure against back or forward movement, and a fender pivoted to said clips, substantially as described.

In testimony whereof we affix our signatures in the presence of two witnesses.

JAMES H. LEWIS.
JOSEPH M. COURTNEY.

Witnesses:
M. R. REMLEY,
E. B. TINKER.